United States Patent
Kim et al.

(10) Patent No.: US 11,255,283 B1
(45) Date of Patent: Feb. 22, 2022

(54) OXIDATION CATALYST BYPASS CONTROL STRATEGY FOR YELLOW SMOKE MITIGATION IN GASEOUS FUEL ENGINE

(71) Applicant: Caterpillar Inc., Peoria, IL (US)

(72) Inventors: Arnold Myoungjin Kim, Peoria, IL (US); Ronald G. Silver, Peoria, IL (US); Paul Sai Keat Wang, Peoria, IL (US); Jaswinder Singh, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/193,352

(22) Filed: Mar. 5, 2021

(51) Int. Cl.
  *F02D 41/02* (2006.01)
  *F02D 41/14* (2006.01)
  *F01N 3/20* (2006.01)
  *F02D 9/04* (2006.01)

(52) U.S. Cl.
  CPC ......... *F02D 41/024* (2013.01); *F01N 3/2006* (2013.01); *F02D 9/04* (2013.01); *F02D 41/146* (2013.01); *F02D 2200/0802* (2013.01); *F02D 2200/10* (2013.01)

(58) Field of Classification Search
  CPC combination set(s) only.
  See application file for complete search history.

(56) References Cited

U.S. PATENT DOCUMENTS

| | | | |
|---|---|---|---|
| 6,807,807 B2 | 10/2004 | Kagenishi | |
| 7,743,602 B2* | 6/2010 | Kalyanaraman | F01N 3/2066 60/286 |
| 7,810,316 B2 | 10/2010 | Salemme et al. | |
| 8,109,081 B2* | 2/2012 | Perry | F02D 41/1445 60/286 |
| 8,800,270 B2 | 8/2014 | Bailey et al. | |
| 9,273,587 B2* | 3/2016 | Khaled | F01N 3/103 |
| 9,624,803 B2 | 4/2017 | Kumar et al. | |
| 2008/0028751 A1* | 2/2008 | Stroia | F01N 13/011 60/286 |
| 2008/0155968 A1* | 7/2008 | Salemme | F01N 13/009 60/288 |
| 2010/0199634 A1 | 8/2010 | Heaton | |
| 2012/0055138 A1* | 3/2012 | Sloane | F01N 3/0842 60/274 |
| 2014/0121941 A1 | 5/2014 | Sivasubramanian et al. | |
| 2015/0354424 A1* | 12/2015 | Kumar | F01N 3/208 60/605.1 |
| 2018/0361359 A1* | 12/2018 | Han | F01N 3/035 |

FOREIGN PATENT DOCUMENTS

KR 101734254 B1 5/2017

* cited by examiner

*Primary Examiner* — Binh Q Tran
(74) *Attorney, Agent, or Firm* — Brannon Sowers & Cracraft

(57) ABSTRACT

A gaseous fuel engine system includes an exhaust controller coupled with a temperature sensor and a NOx sensor, and structured to actuate open an electrically actuated bypass valve to bypass an oxidation catalyst with exhaust, based on an exhaust temperature and an exhaust NOx amount to mitigate production of yellow smoke. Yellow smoke mitigation logic may run during startup and when the gaseous fuel engine is in a lower part of an engine load range. The yellow smoke mitigation logic can be selectively triggered in response to transient engine load increases when the gaseous fuel engine is operating in an upper part of an engine load range.

20 Claims, 2 Drawing Sheets

OXIDATION CATALYST BYPASS CONTROL STRATEGY FOR YELLOW SMOKE MITIGATION IN GASEOUS FUEL ENGINE

TECHNICAL FIELD

The present disclosure relates generally to a gaseous fuel engine system, and more particularly to a strategy for mitigating discharging of yellow smoke in exhaust from the gaseous fuel engine.

BACKGROUND

Gaseous fuel engines are increasingly used throughout the world for diverse applications ranging from vehicle propulsion, operation of pumps and compressors, to electrical power generation. Some gaseous fuel engines employ direct injection or port injection of a gaseous fuel. Other gaseous fuel engines are fueled by way of so-called fumigation, where gaseous fuel is delivered into an intake system for the engine and combined with a flow of air to form a fuel and air stream that is delivered to combustion cylinders in the gaseous fuel engine. Most gaseous fuel engines are spark-ignited, pre-chamber ignited, or liquid pilot-ignited. Gaseous fuel engines operated, for example, on natural gas, tend to produce relatively lower levels of certain emissions, notably particulate emissions and oxides of nitrogen or "NOx", relative to other known engine types. Gaseous fuel engines can also offer the convenience of exploiting fuel sources such as mine gas, landfill gas, oil field natural gas, and others that are available on-site rather than requiring transport and/or storage. Advantages of gaseous fuel engines respecting emissions can often be best realized when the engine is operated on a stoichiometrically lean mixture of fuel and air.

Given the emissions advantages available, many gaseous fuel engines can utilize an exhaust system having a relatively simplified aftertreatment strategy with little or no apparatus for limiting amounts of NOx or particulates in the exhaust that is discharged to ambient. There remain instances where some emissions treatment may be desirable, however, particularly with regard to certain NOx species under specific conditions. One example gaseous fuel engine is set forth in United States Patent Application Publication No. 2014/0121941 to Sivasubramanian et al.

SUMMARY OF THE INVENTION

In one aspect, a method of operating a gaseous fuel engine system includes increasing a temperature of an oxidation catalyst in an exhaust system with heat of exhaust from a gaseous fuel engine to a catalyst activation temperature sufficient to oxidize NO to $NO_2$. The method further includes increasing an amount of a gaseous fuel in a stream of gaseous fuel and air fed to combustion cylinders in the gaseous fuel engine, and bypassing the oxidation catalyst with at least some of the exhaust produced by combustion of the increased amount of gaseous fuel and air in the combustion cylinders. The method further includes discharging exhaust having bypassed the oxidation catalyst from the exhaust system, and limiting an amount of $NO_2$ in the discharged exhaust below a yellow smoke limit based on the bypassing of the oxidation catalyst with at least some of the exhaust.

In another aspect, a gaseous fuel engine system includes a gaseous fuel engine having an engine housing with a plurality of combustion cylinders formed therein, and an intake system having a gaseous fuel admission valve, a compressor located downstream of the gaseous fuel admission valve, and an intake conduit structured to feed a stream of admitted gaseous fuel and air to the plurality of combustion cylinders. The gaseous fuel engine system further includes an exhaust system having an exhaust conduit structured to receive a flow of exhaust from combustion of the gaseous fuel and air in the plurality of combustion cylinders, an oxidation catalyst within the exhaust conduit, a bypass conduit connected to the exhaust conduit at an exhaust entry location upstream of the oxidation catalyst, and an electrically actuated bypass valve. The gaseous fuel engine system also includes a temperature sensor, and an exhaust controller coupled with the temperature sensor and structured to receive temperature data produced by the temperature sensor indicative of a temperature of the oxidation catalyst sufficient to oxidize NO to $NO_2$ in exhaust from the gaseous fuel engine. The exhaust controller is further structured to actuate open the electrically actuated bypass valve to bypass the oxidation catalyst with at least some of the exhaust based on the received temperature data, and to limit an amount of $NO_2$ in exhaust discharged from the exhaust system below a yellow smoke limit based on the bypassing of the oxidation catalyst with at least some of the exhaust.

In still another aspect, a gaseous fuel engine control system includes a temperature sensor structured to produce temperature data indicative of an oxidation catalyst temperature in an exhaust system of a gaseous fuel engine sufficient to oxidize NO to $NO_2$, and a NOx sensor structure to produce exhaust NOx data indicative of an engine-out exhaust NOx amount greater than a steady state exhaust NOx amount. An exhaust controller is coupled with the temperature sensor and with the NOx sensor and structured to receive the temperature data, receive the exhaust NOx data, and command opening an electrically actuated bypass valve to bypass the oxidation catalyst with at least some exhaust from the gaseous fuel engine based on the temperature data and the exhaust NOx data. The exhaust controller is further structured to limit an amount of $NO_2$ in exhaust discharged from the exhaust system below a yellow smoke limit based on the bypassing of the oxidation catalyst with at least some of the exhaust.

DETAILED DESCRIPTION

Figure 1:
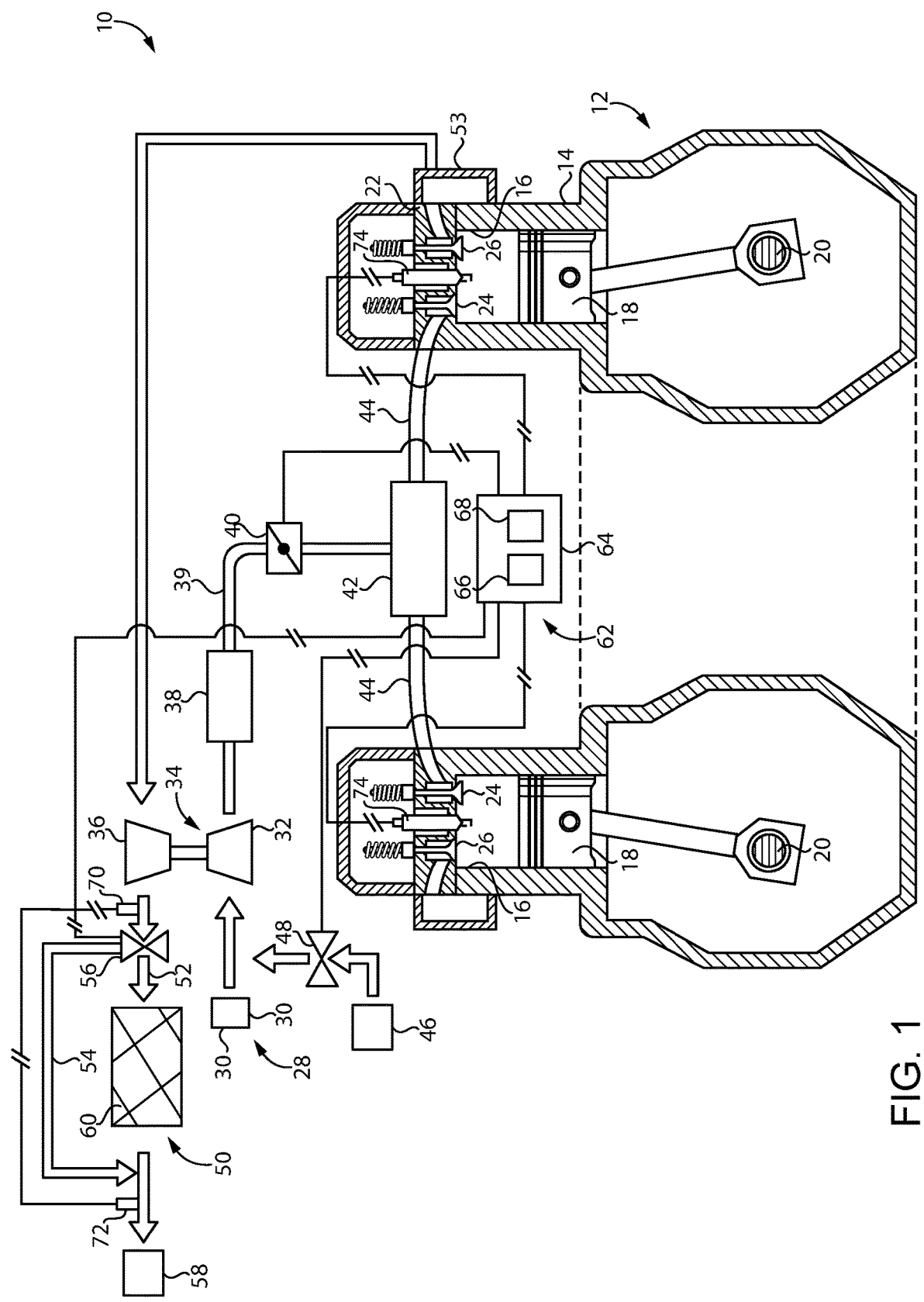
FIG. 1 is a diagrammatic view of a gaseous fuel engine system, according to one embodiment.

Referring to FIG. 1, there is shown a gaseous fuel engine system 10, according to one embodiment. Gaseous fuel engine system 10 (hereinafter "engine system 10") includes a gaseous fuel engine 12 having an engine housing 14 with a plurality of combustion cylinders 16 formed therein. Combustion cylinders 16 can include any number of cylinders in any suitable arrangement, such as an inline pattern, a V-pattern, or still another. Pistons 18 are positioned to reciprocate within combustion cylinders 16 between a bottom dead center position and a top dead center position, typically in a conventional four-cycle pattern. Pistons 18 are coupled with a crankshaft 20 that rotates to provide power for propelling a vehicle, rotating components in a compressor, a pump, or in an electrical generator to name a few examples. Gaseous fuel engine 12 further includes an engine head 22 and intake valves 24 and exhaust valves 26 supported in engine head 22 in a generally conventional manner.

Gaseous fuel engine 12 is spark-ignited and includes sparkplugs 74 associated with each combustion cylinder 16. In other embodiments, gaseous fuel engine 12 might be prechamber-ignited, or pilot-ignited using, for example, a directly injected shot of a pilot fuel such as a diesel distillate fuel to ignite a larger main charge of gaseous fuel. Gaseous fuel engine 12 may operate at a stoichiometrically lean ratio of fuel to air, meaning with an equivalence ratio of fuel to air less than 1, and will be understood as a fumigated gaseous fuel engine and configured such that the same mixture of gaseous fuel and air is delivered to all combustion cylinders. In FIG. 1 engine system 10 is shown including a supply of gaseous fuel 46. Gaseous fuel supply 46 can include line gas such as from a gas field, a mine, a landfill, or still another. In other instances, gaseous fuel supply 46 could include compressed and/or liquified and cryogenically stored gaseous fuel such as liquid natural gas or "LNG," methane, propane, blends, etc.

Engine system 10 further includes an intake system 28. Intake system 28 includes an air inlet 30 and a compressor 32, in a turbocharger 34, structured to receive a flow of intake air from air inlet 30. A turbine 36 of turbocharger 34 receives a flow of exhaust. Intake system 28 may further include an aftercooler 38, an intake manifold 42, and a plurality of intake runners 44 extending from intake manifold 42 to combustion cylinders 16. Intake system 28 further includes a gaseous fuel admission valve 48, which may be electrically actuated, and positioned such that compressor 32 is located downstream of gaseous fuel admission valve 48. An intake conduit 39 is structured to feed a stream of admitted gaseous fuel and air to combustion cylinders 16. A throttle 40 is positioned fluidly upstream of intake manifold 42, and will also typically be electrically actuated.

Engine system 10 further includes an exhaust system 52 that receives a flow of exhaust from an exhaust manifold 53. Exhaust system 50 further includes an exhaust conduit 52 structured to receive a flow of exhaust from combustion of gaseous fuel and air in combustion cylinders 16. An oxidation catalyst is within exhaust conduit 52, such that a flow of exhaust through exhaust conduit 52 is catalytically treated and thenceforth fed to an exhaust outlet 58 such as an exhaust stack or a tailpipe. A bypass conduit 54 is connected to exhaust conduit 52 at an exhaust entry location upstream of oxidation catalyst 60. An electrically actuated bypass valve 56 is positioned fluidly between exhaust conduit 52 and bypass conduit 54, or otherwise configured so as to selectively divert exhaust from exhaust conduit 52 into bypass conduit 54.

Those skilled in the art will be familiar with functioning of an oxidation catalyst in a gaseous fuel engine system. Oxidation catalyst 60, which may include any of a variety of precious metal catalysts or other catalysts, may have a purpose of limiting discharging unburned hydrocarbons and carbon monoxide through exhaust outlet 58 by oxidizing those substances. An oxidation catalyst as contemplated herein will also oxidize nitrogen oxide or NO to nitrogen dioxide or $NO_2$. In a typical case most of the engine-out NOx in exhaust from gaseous fuel engine 12 will be NO, however, some of the NO will be oxidized to $NO_2$ by oxidation catalyst 60 when active. During steady state operation an amount of engine-out NOx may be approximately 200 parts per million or ppm, or less, such as from about 170 ppm to about 180 ppm, within measurement error.

During certain conditions, however, such as engine load transients or during engine startup, engine-out NOx may rise. In some instances, an increase in engine-out NOx in combination with catalytic conversion of NO to $NO_2$, can result in an amount of $NO_2$ ultimately discharged that is sufficient to be visible. The visible $NO_2$ is generally referred to as yellow smoke. At approximately 300 ppm $NO_2$, yellow smoke can sometimes be viewed discharging from an exhaust outlet and can be considered objectionable. Visible yellow smoke can thus result from a relatively large total amount of NOx that the engine is putting out where the oxidation catalyst is at a temperature sufficient to oxidize NO to $NO_2$. A catalytic activation temperature of an oxidation catalyst as contemplated herein may be approximately 200° C. As will be further from the following description, engine system 10 is uniquely configured to mitigate yellow smoke production such that an amount of $NO_2$ in exhaust discharged from exhaust system 50 remains below a yellow smoke limit. Mitigate means reduce or eliminate. The yellow smoke limit can include a yellow smoke visibility limit, such as an amount of $NO_2$ greater than 200 ppm, and for example, approximately 300 ppm. The actual visibility of yellow smoke may depend upon exhaust outlet size or shape in some instances.

To this end, engine system 10 further includes a gaseous fuel engine control system 62 (hereinafter "control system 62"). Control system 62 may include an electronic control unit or exhaust controller 64 having a processor 66 and a computer readable memory 68. Exhaust controller 64 can be, or be a part of, an engine control unit having various engine system control functions. Processor 66 can include any suitable computerized data processor such as a microprocessor or a microcontroller. Computer readable memory 68 can include any suitable computer readable memory such as RAM, ROM, SDRAM, DRAM, EEPROM, flash, or still another. Control system 62 may further include a temperature sensor 70. Temperature sensor 70 may be structured to produce temperature data indicative of an oxidation catalyst temperature in exhaust system 50 sufficient to oxidize NO to $NO_2$. During operation, and particularly upon starting gaseous fuel engine 12, oxidation catalyst 60 may be below its catalyst activation temperature, but will be increased in temperature with heat of exhaust to the catalyst activation temperature as described herein. Control system 62 may further include a NOx sensor 72 structured to produce exhaust NOx data indicative of an exhaust NOx amount, including an exhaust NOx amount greater than a steady state NOx amount. Temperature sensor 70 may include an exhaust temperature sensor exposed to a flow of exhaust conveyed through exhaust conduit 52. Temperature sensor 70 might instead or additionally include a temperature sensor at a different location in exhaust system 50 or even elsewhere in engine system 10 whereby a direct or indirect measure of exhaust temperature can be sensed or estimated, enabling a determination directly or by inference that oxidation catalyst 60 is at a catalyst activation temperature sufficient to oxidize NO to $NO_2$. The catalyst activation temperature might be approximately 200° C. as noted above. NOx sensor 72 can be a NOx sensor of any suitable design and operation and having any suitable placement that enables direct or indirect sensing, measurement, monitoring of an actual engine-out NOx amount or a relative NOx amount in exhaust from gaseous fuel engine 12. In the illustrated embodiment, temperature sensor 70 is located upstream of oxidation catalyst 60 and downstream of turbine 36. Also in the illustrated embodiment, NOx sensor 72 is positioned downstream of oxidation catalyst 60. The terms "upstream" and "downstream" as used herein refer in the case of exhaust system 50 to a direction toward gaseous fuel engine 12 and toward exhaust outlet 58, respectively. In the case of intake system 28, the terms "upstream" and "downstream" mean toward air inlet 30 and toward gaseous fuel engine 12, respectively.

Figure 2:
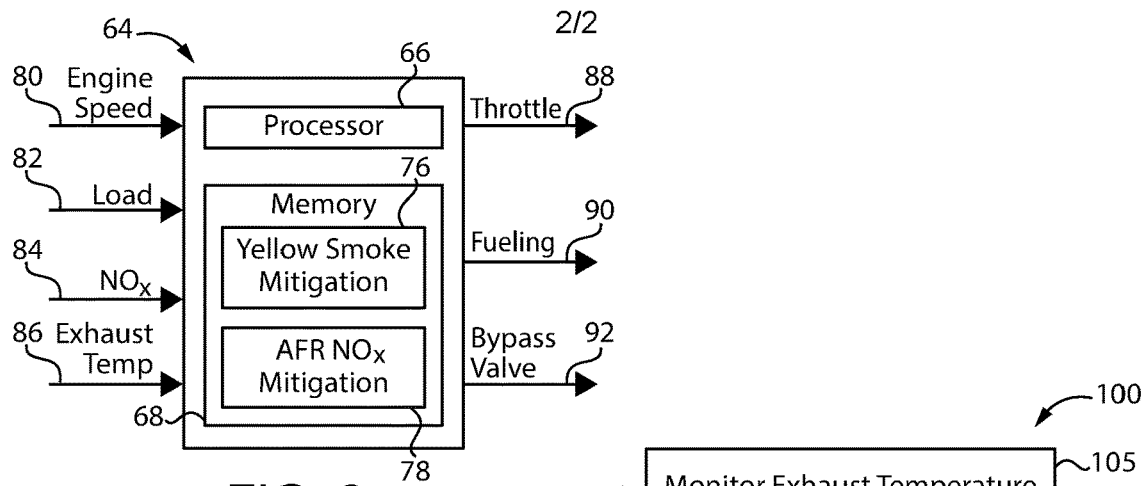
FIG. 2 is a block diagram of controller structure, according to one embodiment.

Referring also now to FIG. 2, exhaust controller 64 is coupled with temperature sensor 70 and with NOx sensor 72. Exhaust controller 64 is structured to receive temperature data produced by temperature sensor 70 indicative of a temperature of oxidation catalyst 60 sufficient to oxidize NO to $NO_2$ as noted above. Exhaust controller 64 is also structured to receive exhaust NOx data indicative of an exhaust NOx amount greater than a steady state exhaust NOx amount. An exhaust NOx amount greater than a steady state NOx amount means an exhaust amount that is greater than an exhaust NOx amount that would be expected when engine system 10 is at a steady state and not changing engine speed or engine load, or only changing speed or load within a relatively narrow range of expected normal fluctuation.

As depicted in FIG. 2, exhaust controller 64 receives an engine speed signal 80, an engine load signal 82, a NOx signal 84, and an exhaust temperature signal 86. NOx signal 84 may be or be derived from the NOx data explained above, and exhaust temperature signal 86 may be or be derived from the temperature data explained above. Exhaust controller 64 may also output a throttle signal 88, such as a throttle area command for positioning or adjusting throttle 40, a fueling signal 90 such as a valve or actuator position signal for positioning or adjusting gaseous fuel admission valve 48, and a bypass valve command 92. Bypass valve command 92 may be an actuator control current to an actuator of bypass valve 56, for instance. Exhaust controller 64 may be further structured to actuate open electrically actuated bypass valve 56 to bypass oxidation catalyst 60 with at least some exhaust based on the received temperature data, for example sensed exhaust temperature, and the received exhaust NOx data, for example sensed NOx amount. Commanded opening, and the resultant actual opening, of electrically actuated bypass valve 56 enables at least some, and typically all, of the exhaust produced by gaseous fuel engine 12 to not pass through oxidation catalyst 60. As a result, diverted exhaust that is returned to exhaust conduit 52 at a location downstream of oxidation catalyst 60, or directed to another outlet path, does not contain sufficient $NO_2$ to produce yellow smoke, as the catalytic contribution of oxidation catalyst 60 to $NO_2$ in exhaust is avoided. Exhaust controller 64 is thus understood as further structured to limit an amount of $NO_2$ in exhaust discharged from exhaust system 50 below a yellow smoke limit, based on the bypassing of oxidation catalyst 60 with at least some of the exhaust. When conditions change such that yellow smoke mitigation is no longer necessary, as further discussed herein, exhaust controller 64 can command closing of bypass valve 56 to restore full flow of exhaust through oxidation catalyst 60. It should be appreciated that bypass valve 56 might be a single valve having multiple positions, at one of which exhaust flow is directed through oxidation catalyst 60 and at another of which exhaust flow is directed to bypass conduit 54. In other implementations, multiple valves might be used.

Exhaust controller 64 also includes yellow smoke mitigation logic or software 76 stored on memory 68 and air fuel ratio or AFR NOx mitigation logic or software 78 stored on memory 68. At steady state operation exhaust controller 64 may execute AFR NOx mitigation logic 78 to control an engine-out NOx amount to below a desired NOx amount limit. During startup or transients, AFR NOx mitigation logic 78 may be deactivated and control handed off to yellow smoke mitigation logic 76, as further discussed herein.

INDUSTRIAL APPLICABILITY

Figure 3:
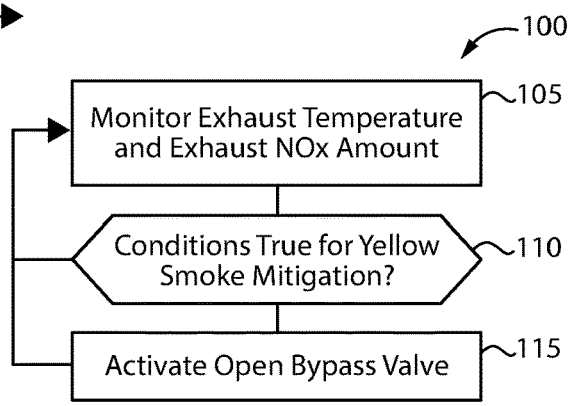
FIG. 3 is a flowchart illustrating example logic flow, according to one embodiment.

Referring now also to FIG. 3, there is shown a flowchart 100 illustrating example logic flow in mitigating yellow smoke according to the present disclosure. In flowchart 100, at a step 105 exhaust temperature and exhaust NOx amount are monitored. It will be recalled that exhaust controller 64 is monitoring exhaust temperature and exhaust NOx amount to determine whether a monitored exhaust NOx amount from the engine is greater than a steady state NOx amount, and whether oxidation catalyst 60 is capable of catalytically oxidizing NO to $NO_2$, in other words by determining whether a monitored exhaust temperature/oxidation catalyst temperature is at or above the catalyst activation temperature. At a block 110, exhaust controller 64 queries whether conditions are true for yellow smoke mitigation. At block 110 exhaust controller 64 is understood to be determining whether, in combination, engine-out exhaust NOx amount and exhaust temperature indicate that yellow smoke production is occurring, is likely to occur, or otherwise a risk of yellow smoke production and discharging exists. If no, the logic can loop back to execute block 105 again. If yes, the logic can advance to a block 115 to command actuating open electrically actuated bypass valve 56 to bypass oxidation catalyst 30. Put differently, the bypassing of oxidation catalyst 60 is based on the determination that the monitored exhaust NOx amount is above a steady state NOx amount and the determination that the oxidation catalyst temperature is at or above the catalyst activation temperature. The logic can then return to block 105 to continue monitoring exhaust temperature and exhaust NOx amount. When block 110 is executed again it might be determined that exhaust temperature has decreased below the catalyst activation temperature and/or engine-out exhaust NOx amount has decreased, and that yellow smoke mitigation is no longer required.

It will be recalled that yellow smoke mitigation logic 76 can be activated and run continuously during certain engine conditions. In one example, yellow smoke mitigation logic 76 is executed during starting engine 12, and up to some predetermined load level, such as a 50% load level (50% of rated engine load), a 40% load level, a 60% load level. At or above the predetermined engine load level, yellow smoke mitigation logic 76 might be executed only upon detecting the occurrence of an engine load transient, such as an increase in engine load as might be employed to speed up gaseous fuel engine 12 to produce an increased electrical power output in a driven electrical generator. Detecting the occurrence of an engine load transient means a transient is observed, expected, or demanded such as by an operator or a supervisory controller. When engine system 10 is operated below the predetermined load level, AFR NOx mitigation logic will typically not be activated. When engine system 10 is operated above the predetermined load level, such as at or above a 50% engine load level, AFR NOx mitigation logic 78 may be deactivated and execution of yellow smoke mitigation logic 76 triggered while the engine load transient is satisfied by varying engine load.

During starting of gaseous fuel engine 12, an amount of admitted gaseous fuel may be increased to gradually speed up gaseous fuel engine 12. After starting gaseous fuel engine 12, an amount of admitted gaseous fuel may be increased to satisfy engine load transients. At least in the case of satisfying an engine load transient, and also potentially during startup, an amount of gaseous fuel admitted to intake conduit 39 may be increased so as to enrich an AFR in the stream of gaseous fuel and air conveyed through intake conduit 39 from a stoichiometrically lean AFR. The lean AFR may be increased to an AFR that is relatively richer in gaseous fuel, and temporarily no longer stoichiometrically lean in at least some instances. As described herein bypassing oxidation catalyst 60 can include bypassing oxidation catalyst 60 with at least some of the exhaust produced by combustion of an increased amount of gaseous fuel. It has been observed that in relatively lean gaseous fuel engine applications it can be necessary to substantially increase an amount of gaseous fuel to satisfy engine load transients, at least in part leading to the yellow smoke considerations discussed herein.

Figure 4:
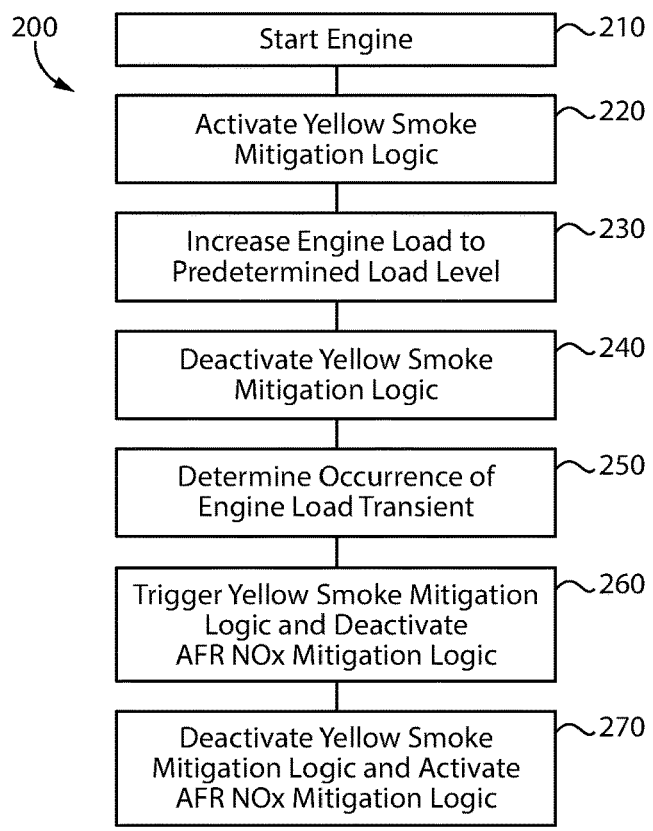
FIG. 4 is another flowchart illustrating example logic flow, according to one embodiment.

Referring also now to FIG. 4, there is shown another flowchart 200 illustrating additional example logic functions of exhaust controller 64 as discussed herein. Gaseous fuel engine 12 is started at a block 210. From block 210, flowchart 200 may advance to a block 220 where yellow smoke mitigation logic 76 is activated. From block 220 the logic may advance to a block 230 to increase engine load to a predetermined load level. Here, engine system 10 can be understood to be gradually increasing engine load from starting towards a higher load level such as a rated engine load, but in any event increases engine load to and typically beyond the predetermined load level, such as 50% engine load. During the increasing of the engine load, an amount of gaseous fuel admitted into intake conduit 39 is increased, and a temperature of oxidation catalyst increased to its catalyst activation temperature. Execution of yellow smoke mitigation logic during this period of increasing engine load can be expected to prevent discharging of yellow smoke as described herein by selectively initiating bypassing of oxidation catalyst 60 with exhaust based on the triggered execution of yellow smoke mitigation logic.

From block 230, flowchart 200 may advance to a block 240 to deactivate yellow smoke mitigation logic 76 as discussed herein. At this point, AFR NOx mitigation logic 78 may be activated, such that AFR is controlled to maintain engine NOx production below some desired limit which might be jurisdictionally mandated. From block 240, flowchart 200 may advance to a block 250 to determine the occurrence of an engine load transient. Determining the occurrence of an engine load transient could include monitoring factors such as fueling, mass fuel and air flow, or a variety of other known factors whereby engine load and/or changes in engine load are determined, estimated or inferred. In one implementation the determining of the occurrence of an engine load transient includes determining an engine load increase is demanded by another controller, such as an electrical generator controller of an electrical generator powered by engine system 10. In any event, during or prior to satisfying the engine load transient, at a block 260 execution of yellow smoke mitigation logic 76 is triggered, and AFR NOx mitigation logic 78 is deactivated. From block 260, flowchart 200 may advance to a block 270 to deactivate yellow smoke mitigation logic 76 and activate AFR NOx mitigation logic 78.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure.

Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine system comprising:
   increasing a temperature of an oxidation catalyst in an exhaust system with heat of exhaust from a gaseous fuel engine to a catalyst activation temperature sufficient to oxidize NO to $NO_2$;
   increasing an amount of a gaseous fuel in a stream of gaseous fuel and air fed to combustion cylinders in the gaseous fuel engine;
   bypassing the oxidation catalyst with at least some of the exhaust produced by combustion of the increased amount of gaseous fuel and air in the combustion cylinders;
   discharging exhaust having bypassed the oxidation catalyst from the exhaust system; and
   limiting an amount of $NO_2$ in the discharged exhaust below a yellow smoke limit based on the bypassing of the oxidation catalyst with at least some of the exhaust.

2. The method of claim 1 wherein the bypassing of the oxidation catalyst further includes opening an electrically actuated bypass valve to divert a flow of exhaust from an exhaust conduit into a bypass conduit at a location upstream of the oxidation catalyst.

3. The method of claim 1 wherein the increasing of the amount of gaseous fuel includes increasing the amount of gaseous fuel to satisfy an engine load transient.

4. The method of claim 3 wherein the increasing of the amount of gaseous fuel further includes increasing an amount of the gaseous fuel admitted to an intake conduit for the gaseous fuel engine at a location upstream of a compressor, to enrich an air to fuel ratio (AFR) in the stream of gaseous fuel and air from a stoichiometrically lean AFR.

5. The method of claim 3 further comprising triggering execution of yellow smoke mitigation logic based on the engine load transient, and initiating the bypassing of the oxidation catalyst based on the triggered execution of the yellow smoke mitigation logic.

6. The method of claim 5 further comprising deactivating AFR NOx mitigation logic based on the engine load transient.

7. The method of claim 1 further comprising:
   monitoring an exhaust temperature; and
   determining the oxidation catalyst is at or above the catalyst activation temperature based on the monitored exhaust temperature.

8. The method of claim 7 further comprising:
   monitoring an exhaust NOx amount;
   determining the monitored exhaust NOx amount is above a steady state NOx amount; and
   the bypassing of the oxidation catalyst is based on the determination that the oxidation catalyst is at or above the catalyst activation temperature and the determination that the monitored exhaust NOx amount is above a steady state NOx amount.

9. The method of claim 1 wherein the yellow smoke limit is a yellow smoke visibility limit.

10. A gaseous fuel engine system comprising:
a gaseous fuel engine including an engine housing having a plurality of combustion cylinders formed therein;
an intake system including a gaseous fuel admission valve, a compressor located downstream of the gaseous fuel admission valve, and an intake conduit structured to feed a stream of admitted gaseous fuel and air to the plurality of combustion cylinders;
an exhaust system including an exhaust conduit structured to receive a flow of exhaust from combustion of the gaseous fuel and air in the plurality of combustion cylinders, an oxidation catalyst within the exhaust conduit, a bypass conduit connected to the exhaust conduit at an exhaust entry location upstream of the oxidation catalyst, and an electrically actuated bypass valve;
a temperature sensor; and
an exhaust controller coupled with the temperature sensor and structured to:
receive temperature data produced by the temperature sensor indicative of a temperature of the oxidation catalyst sufficient to oxidize NO to $NO_2$ in exhaust from the gaseous fuel engine;
actuate open the electrically actuated bypass valve to bypass the oxidation catalyst with at least some of the exhaust based on the received temperature data; and
limit an amount of $NO_2$ in exhaust discharged from the exhaust system below a yellow smoke limit based on the bypassing of the oxidation catalyst with at least some of the exhaust.

11. The gaseous fuel engine system of claim 10 wherein the exhaust controller is further structured to determine the occurrence of an engine load transient, and to actuate open the electrically actuated bypass valve based on the determined occurrence of the engine load transient.

12. The gaseous fuel engine system of claim 11 wherein the exhaust controller is further structured to:
deactivate yellow smoke mitigation logic based on a steady state engine load level; and
trigger execution of the yellow smoke mitigation logic based on the determined occurrence of the engine load transient.

13. The gaseous fuel engine system of claim 10 further comprising a NOx sensor, and the exhaust controller is further structured to actuate open the electrically actuated bypass valve based on a sensed NOx exhaust amount.

14. The gaseous fuel engine system of claim 13 wherein the temperature sensor includes an exhaust temperature sensor positioned upstream of the oxidation catalyst, and the NOx sensor is positioned downstream of the oxidation catalyst.

15. The gaseous fuel engine system of claim 14 wherein the yellow smoke limit includes a yellow smoke visibility limit of about 300 ppm $NO_2$.

16. A gaseous fuel engine control system comprising:
a temperature sensor structured to produce temperature data indicative of an oxidation catalyst temperature in an exhaust system of a gaseous fuel engine sufficient to oxidize NO to $NO_2$;
a NOx sensor structure to produce exhaust NOx data indicative of an engine-out exhaust NOx amount greater than a steady state exhaust NOx amount;
an exhaust controller coupled with the temperature sensor and with the NOx sensor structured to:
receive the temperature data;
receive the exhaust NOx data;
command opening an electrically actuated bypass valve to bypass the oxidation catalyst with at least some exhaust from the gaseous fuel engine based on the temperature data and the exhaust NOx data; and
limit an amount of $NO_2$ in exhaust discharged from the exhaust system below a yellow smoke limit based on the bypassing of the oxidation catalyst with at least some of the exhaust.

17. The control system of claim 16 wherein the steady state exhaust NOx amount is less than 200 ppm NOx, and the yellow smoke limit includes a yellow smoke visibility limit that is greater than 200 ppm $NO_2$.

18. The control system of claim 16 wherein the exhaust controller is further structured to determine the occurrence of an engine load transient, and to command the opening of the electrically actuated bypass valve based on the determined occurrence of the engine load transient.

19. The control system of claim 18 wherein the exhaust controller is further structured to:
deactivate yellow smoke mitigation logic based on an engine load level; and
trigger execution of the yellow smoke mitigation logic based on the determining of the occurrence of the engine load transient.

20. The control system of claim 19 wherein the engine load level is about 50% engine load.

* * * * *